US012250904B2

United States Patent
Bejcek et al.

(10) Patent No.: US 12,250,904 B2
(45) Date of Patent: Mar. 18, 2025

(54) CONTROL-BY-WIRE SYSTEM FOR A WALK-BEHIND SELF-PROPELLED MACHINE, LAWNMOWER INCLUDING SAME, AND METHOD

(71) Applicant: Honda Motor Co., Ltd., Tokyo (JP)

(72) Inventors: Andrew Edwin Bejcek, Chapel Hill, NC (US); Steven J. Busjahn, Swansboro, NC (US); Aaron J. Parks-Ksor, Greensboro, NC (US); Dean Edward Hartley, Burlington, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 735 days.

(21) Appl. No.: 17/529,919

(22) Filed: Nov. 18, 2021

(65) Prior Publication Data

US 2023/0148472 A1    May 18, 2023

(51) Int. Cl.
*A01D 34/00* (2006.01)
*A01D 34/68* (2006.01)
*A01D 34/82* (2006.01)
*A01D 101/00* (2006.01)

(52) U.S. Cl.
CPC ......... *A01D 34/822* (2013.01); *A01D 34/006* (2013.01); *A01D 34/6812* (2013.01); *A01D 34/6818* (2013.01); *A01D 34/824* (2013.01); *A01D 2101/00* (2013.01)

(58) Field of Classification Search
CPC ............... A01D 34/822; A01D 34/006; A01D 34/6812; A01D 34/6818; A01D 34/824; G05B 19/4155; G05G 1/01; G05G 1/04
See application file for complete search history.

(56) References Cited

U.S. PATENT DOCUMENTS

| | | | |
|---|---|---|---|
| 5,934,052 | A | 8/1999 | Kamm |
| 6,501,281 | B1 | 12/2002 | Rundo |
| 6,796,387 | B1 | 9/2004 | Lund et al. |
| 7,034,552 | B2 | 4/2006 | Kirchner et al. |
| 7,228,679 | B2 | 6/2007 | Berkeley |
| 7,240,756 | B2 | 7/2007 | Derby, V. |

(Continued)

FOREIGN PATENT DOCUMENTS

| | | |
|---|---|---|
| CN | 207519151 U | 6/2018 |
| JP | 3761378 B2 | 3/2006 |

(Continued)

*Primary Examiner* — Adam J Behrens
*Assistant Examiner* — Robert E Pezzuto
(74) *Attorney, Agent, or Firm* — KENEALY VAIDYA LLP

(57) ABSTRACT

A control system can be used for a walk-behind self-propelled machine that includes a handle, a power source, a drive assembly, and an implement selectively driven by the power source. The control system can include a touch sensor located on the handle configured to transmit a contact signal indicative of an operator of the walk-behind self-propelled machine physically contacting the handle at a predetermined location. The system can further include a controller that is in electrical communication with the touch sensor and configured to enable the power source to drive the implement, such as a lawnmower blade, when the controller receives the contact signal.

20 Claims, 7 Drawing Sheets

(56) References Cited

U.S. PATENT DOCUMENTS

| | | |
|---|---|---|
| 8,141,886 B1 | 3/2012 | Sugden et al. |
| 9,220,194 B2 | 12/2015 | Ulmefors et al. |
| 9,616,893 B2 | 4/2017 | Bejcek |
| 10,356,977 B2 | 7/2019 | Kulkarni et al. |
| 10,390,482 B2 | 8/2019 | Kuriyagawa et al. |
| 2013/0111865 A1* | 5/2013 | Hansen ................ A01D 34/828 56/11.3 |
| 2017/0245429 A1* | 8/2017 | Kuriyagawa ........ A01D 34/008 |

FOREIGN PATENT DOCUMENTS

| | | | |
|---|---|---|---|
| JP | 2014069635 A | 4/2014 | |
| WO | WO9618067 A1 | 6/1996 | |

* cited by examiner

CONTROL-BY-WIRE SYSTEM FOR A WALK-BEHIND SELF-PROPELLED MACHINE, LAWNMOWER INCLUDING SAME, AND METHOD

BACKGROUND

The disclosed subject matter relates to a self-propelled walk-behind machine. More particularly, the disclosed subject matter relates to methods and apparatus that incorporate a control-by-wire operation of the machine.

Walk-behind machines, such as but not limited to lawnmowers, can include a implement driving assembly that drives at least one implement and a propulsion drive assembly that propels the machine along a travel surface. The implement driving assembly and the propulsion drive assembly can be coupled to a power source such as but not limited to an internal combustion engine or an electric motor.

The implement drive assembly can include one or more user inputs that control the movement of the implement. For example, the implement drive assembly can include a user input that stops movement of the implement when the operator of the machine releases the user input.

The propulsion drive assembly can include one or more user inputs that can permit an operator of the machine to manually vary the speed at which the propulsion drive assembly propels the machine. Some user inputs are configured to either drive the machine at a single predetermined speed or to terminate self-propulsion of the machine. Other user inputs are configured to permit the operator to vary the speed at which the propulsion drive assembly propels the machine between a range of speeds that can be varied continuously or in steps between a maximum speed and zero speed.

The user inputs of a walk-behind machine can include mechanical inputs such as but not limited to a rotary knob, a throttle lever and cable, and a pivoting bale lever.

SUMMARY

Some embodiments are directed to a control system for a walk-behind self-propelled machine including a handle, a power source, a drive assembly, and an implement selectively driven by the power source. The control by-wire system can include a touch sensor located on the handle configured to transmit a contact signal indicative of an operator of the walk-behind self-propelled machine physically contacting the handle at a predetermined location. The system can further include a controller that is in electrical communication with the touch sensor and configured to enable the power source to drive the implement, such as a lawnmower blade, when the controller receives the contact signal.

Some embodiments are directed to a walk-behind lawnmower that can include a cutter housing, a blade, a power source, a plurality of wheels, a handle, a drive assembly, and a control by wire system. The blade rotatably can be supported in the cutter housing. The power source can be mounted on the cutter housing and configured to selectively rotate the blade. The plurality of wheels can support the cutter housing. The handle can be connected to the cutter housing and extend away from the cutter housing. The drive assembly can be mounted to the cutter housing, connected to at least one of the wheels, and configured to selectively drive the at least one wheel. The control-by-wire system can be in electrical communication with the drive assembly. The control by wire system can include a user input structure located on the handle and configured to transmit a plurality of different electrical control signals, a touch sensor mounted on the handle and configured to transmit a contact signal indicative of an operator of the walk-behind lawnmower physically contacting a predetermined location on the handle, and a controller in electrical communication with each of the user input structure and the touch sensor. The controller can be configured to cause the power source to rotate the blade when the controller receives the contact signal and based on which of the electrical control signals the controller receives, and transmit a drive control signal to the drive assembly based on which of the electrical control signals the controller receives.

Some embodiments are directed to a method for controlling a walk-behind self-propelled machine. The method can include electronically sensing a presence of an operator grasping a handle of the walk-behind self-propelled machine; enabling a power source to drive an implement of the walk-behind self-propelled machine when the presence of the operator is sensed electronically; displaying a ready signal to the operator when the presence of the operator is sensed electronically; moving the implement when the operator inputs an electronic drive command in response to the ready signal; and terminating movement of the implement when electronically sensing the absence of the operator grasping the handle or when the operator inputs an electronic stop command.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A walk-behind machine made in accordance with principles of the disclosed subject matter can include at least one user input configured as a by-wire user input. The by-wire user input can be configured to transmit an electronic request signal to an electronic control unit (also referred to as an ECU, a microprocessor or a controller). In response to the electronic request signal, the controller can be configured to output an electronic command signal to an electric/electronic device that converts electrical energy into mechanical motion.

Exemplary embodiments of the walk-behind self-propelled machine can include but are not limited to a lawnmower, a tiller, a lawn edger, an aerator, and a snowblower. The walk-behind machine can include at least one tool or implement that is mechanically driven (directly or indirectly) by a power source such as an internal combustion engine, an electric actuator such an electric motor or a solenoid, or a hybrid system that includes an internal combustion engine and an electric motor. The tool or implement can be, for example, a blade, tines, or an auger. The same power source can propel the walk-behind self-propelled machine. Alternate embodiments can include a first power source for driving the tool or implement and a second power source for propelling the walk-behind machine. The second power source can be the same type of power source as the first power source or a different type of power source as the first power source.

Some embodiments of the walk-behind machine can include at least one electric motor or actuator powered by a source of electric power such as a battery mounted on the walk-behind device or an external source of electricity connected to the machine by an electric cable. One or more by-wire user inputs can provide advantageous control of the electric motor(s) as compared to a mechanical control system. Further details of the by-wire user inputs will be described below.

Figure 1:
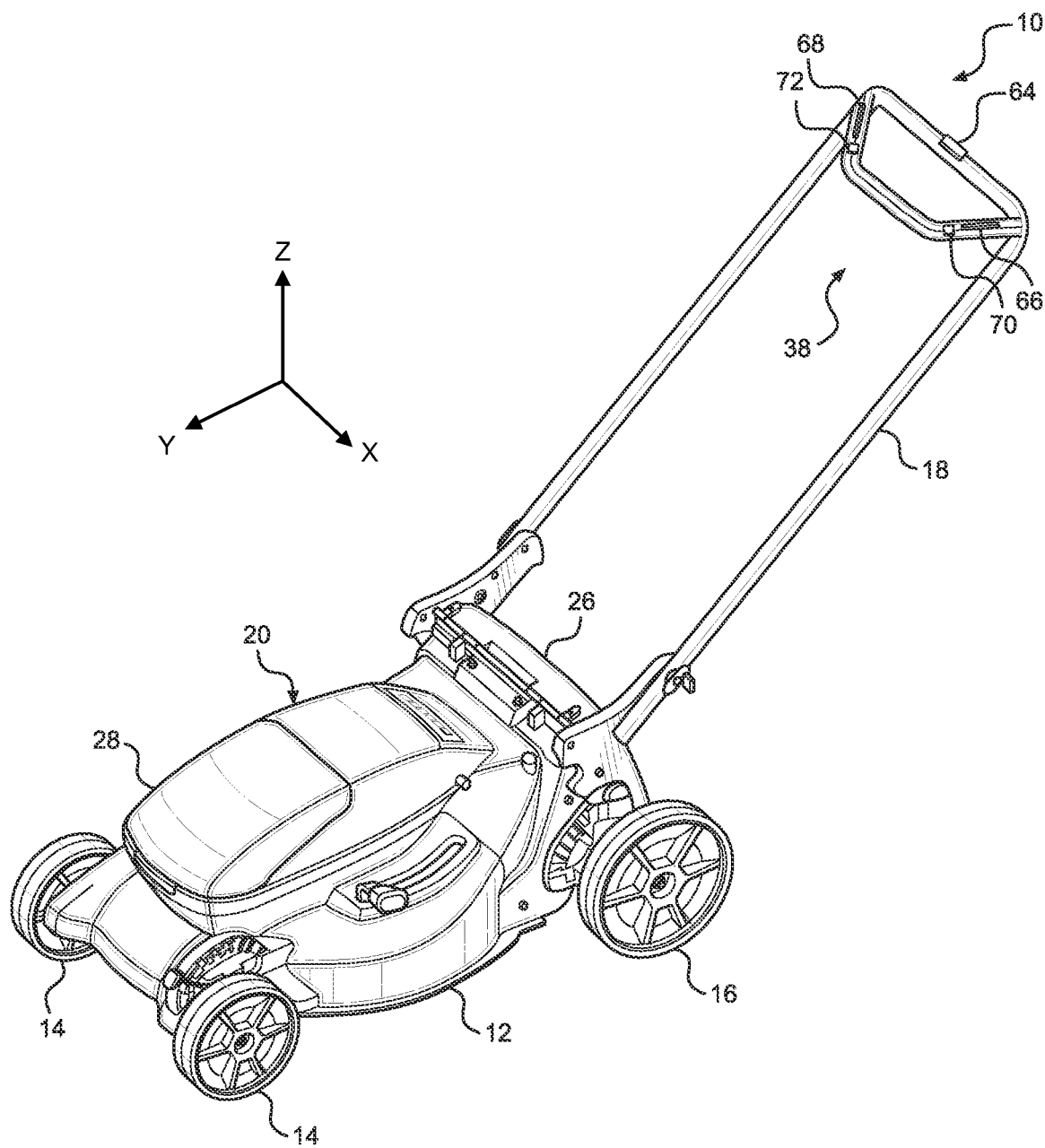
FIG. 1 is a perspective view of a lawnmower made in accordance with principles of the disclosed subject matter.
Figure 2:
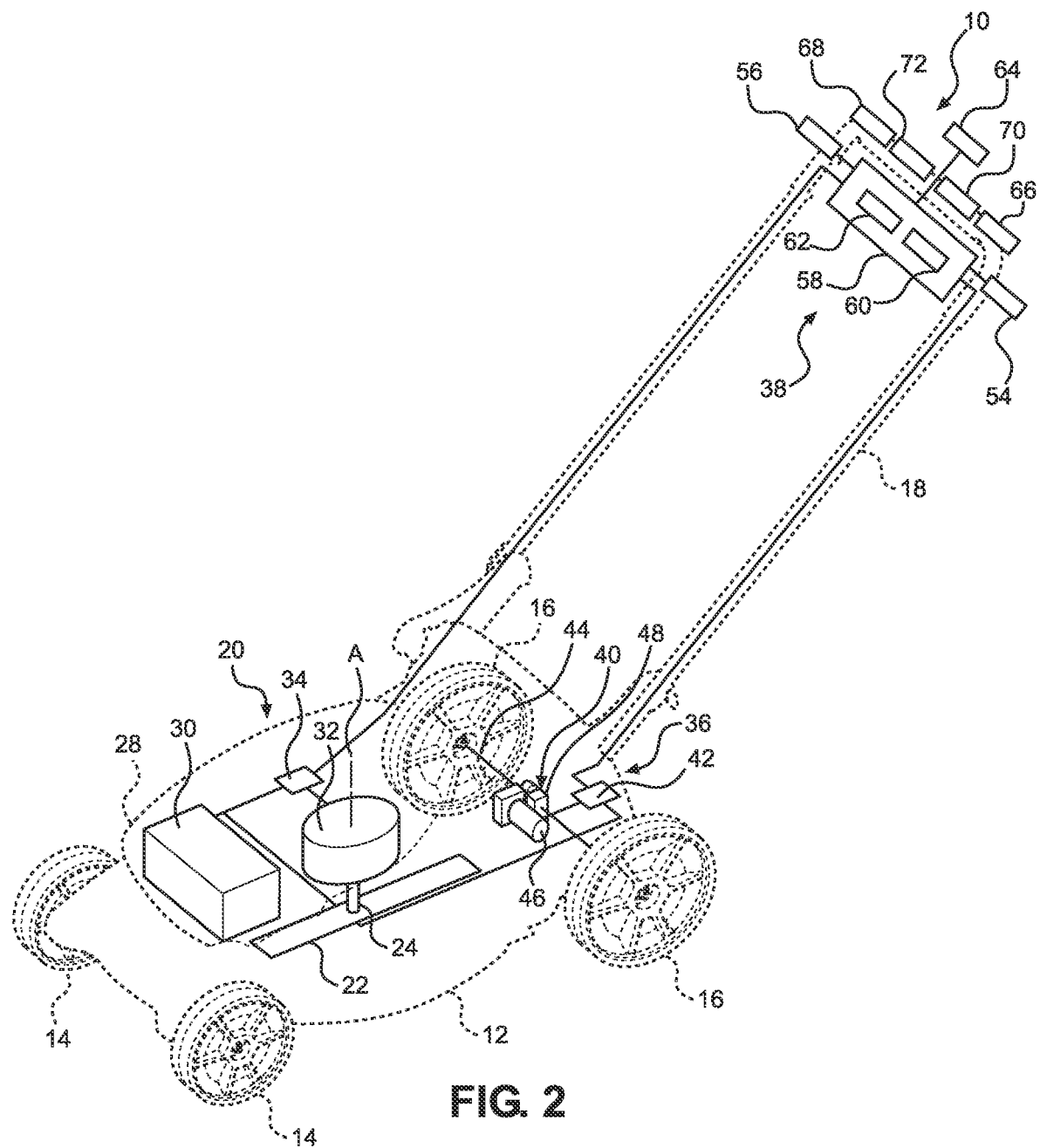
FIG. 2 is perspective schematic view of a power source assembly and a control system for operating a cutting blade and propelling the lawnmower of FIG. 1, with exterior portions of the lawnmower shown in phantom.

FIG. 1 illustrates an exemplary embodiment of a walk-behind self-propelled machine that is configured as a lawnmower 10. The lawnmower 10 can include a cutter housing 12, a pair of front wheels 14, a pair of rear wheels 16, a handle 18 and a power source assembly 20. The rear wheel 16 on the right side of the lawnmower is obstructed from view in FIG. 1 by the cutter housing 12. FIG. 2 shows the right rear wheel 16 in phantom.

Referring to FIG. 2, the lawnmower 10 can include a blade 22 and a blade shaft 24 connected to each of the blade 22 and the power source assembly 20. The power source assembly 20 can be configured to selectively rotate the blade shaft 24 and the blade 22 in the cutter housing 12 about a blade axis A. The blade shaft 24 can be referred to as a component of the power source assembly 20. Alternatively, the blade shaft 24 can be referred to as a component that is connected to and driven by the power source assembly 20.

The cutter housing 12 can be referred to as a mower deck or as a cutter deck or as a deck. Referring to FIG. 1, the cutter housing 12 can include an opening at a rear end 26 of the cutter housing 12. The lawnmower 10 can include a collection bag that can be selectively attached to and detached from the rear end 26. The opening and the collection bag are omitted for simplicity and clarity of the drawing figures. The collection bag can be in communication with the opening such that vegetation clippings produced by the blade 22 can be collected in the collection bag.

FIG. 2 schematically illustrates exemplary components of the power source assembly 20. The power source assembly 20 can include a housing 28 (shown in phantom), a battery pack 30, a blade motor 32, a blade motor driver 34, a drive assembly 36 and a control-by-wire system 38 (also referred to as a control system). Referring to FIGS. 1 and 2, the housing 28 can contain the battery pack 30, the blade motor 32 and the blade motor driver 34. The drive assembly 36 can be spaced away from the housing 28.

The battery pack 30 can include at least one battery cell and a case that houses the at least one battery cell. The battery cell can be configured to store electricity and supply electricity to the blade motor 32.

The blade motor 32 can be a direct current electric motor or an alternating current electric motor. Embodiments can include a blade motor 32 that is configured as a direct current outer rotor motor that includes an inner stator and an outer rotor. The blade motor 32 can include one or more sensors that provide the blade motor driver 34 with information regarding the temperature, rotational speed, power output, etc., of the blade motor 32. The outer rotor of the blade motor 32 can be directly connected to the shaft 24 in any appropriate manner such that the blade motor 32 can cause the blade shaft 24 to rotate.

The blade motor driver 34 can be in electrical communication with each of the battery 30 and the blade motor 32. The blade motor driver 34 can be configured to convert power from the battery pack 30 into output power supplied to the blade motor 32. The blade motor driver 34 can be configured to monitor the operational conditions of the blade motor 32 and the battery pack 30. The blade motor driver 34 can be configured to control the voltage and/or current output by the battery pack 30 based on the operational conditions of the blade motor 32 and the battery pack 30 switching one or more power transistors to adjust the supply of electrical power to the blade motor 32.

The blade motor driver 34 can also be configured to control the voltage or current output by the battery pack 30, and to supply the voltage or current to the blade motor 32 using the one or more power transistors based on one or more inputs to the control assembly 38 by the operator of the electric lawnmower 10.

The blade motor driver 34 can be in electrical communication with each of the control system 38, the blade motor 32 and the battery pack 30. The blade motor driver 34 can be configured to initiate, adjust or terminate supply of voltage or current from the battery pack 30 to the blade motor 32 based on inputs received from the control system 38, the battery pack 30 and the blade motor 32. The blade motor driver 34 can also be configured to regulate the charging of the battery cell(s) of the battery pack 30.

The drive assembly 36 can be mounted to the cutter housing 12 at a position that is underneath the cutter housing 12. The drive assembly 36 can include a drive transmission 40 and a propulsion motor driver 42. The propulsion motor driver 42 can be in electrical communication with each of the battery pack 30 and the drive transmission 40. A drive shaft 44 can be connected to each of the drive transmission 40 and at least one of the rear wheels 16 (and/or front wheel(s) 14) in any appropriate manner such that the drive transmission 40 can cause the drive shaft 44 to rotate, which in turn can cause the rear wheels 16 (and/or front wheel(s) 14) to rotate.

The drive transmission 40 can also include a propulsion motor 46 and a gear transmission 48 connecting the propulsion motor 46 to the drive shaft 44. The propulsion motor 46 can be a direct current electric motor or an alternating current electric motor. The propulsion motor 46 can include one or more sensors that provide the propulsion motor driver 42 with information regarding the temperature, rotational speed, power output, etc., of the propulsion motor 46.

The propulsion motor driver 42 can be in electrical communication with each of the battery pack 30, the control system 38 and the propulsion motor 46. The propulsion motor driver 42 can be configured to convert power from the battery pack 30 into output power supplied to the propulsion motor 46. The propulsion motor driver 42 can be configured to monitor the operational conditions of the propulsion motor 46 and the battery pack 30. The propulsion motor driver 42 can be configured to control the voltage or current output by the battery pack 30 based on the operational conditions of the propulsion motor 46 and the battery pack 30 by switching one or more power transistors to adjust the supply of electrical power to the propulsion motor 46.

The propulsion motor driver 42 can also be configured to control the voltage or current output by the battery pack 30, and to supply the voltage or current to the propulsion motor 46 based on one or more inputs by the operator of the electric lawnmower 10 using the one or more power transistors.

The propulsion motor driver 42 can be configured to initiate, adjust or terminate supply of voltage or current from the battery pack 30 to the propulsion motor 46 based on inputs received from the battery pack 30, the propulsion motor 46 and one or more user inputs to the control system 38.

The control system 38 can include a plurality of user inputs (sensors/switches) 54, 56, 64, 66, 68, 70, 72, a main controller 60 and a sensor array 62. The control system 38 can be mounted on the handle 18 in any appropriate position and orientation on the handle 18 that can facilitate actuation of the user inputs by an operator of the lawnmower 10. The control system 38 can be configured to actuate one or more operational features of the lawnmower 10.

The main controller 60 can be in electrical communication with the battery pack 30, the propulsion motor driver 42, each of user inputs 54, 56, 64, 66, 68, 70, 72 and the sensor array 62. The main controller 60 can be configured to signal the blade motor driver 34 to initiate, adjust or terminate supply of voltage or current from the battery pack 30 to the blade motor 32 based on inputs received from any of the battery pack 30, the blade motor 32 and the user inputs 54, 56, 64. The main controller 60 can be configured to signal the propulsion motor driver 42 to initiate, adjust or terminate supply of voltage or current from the battery pack 30 to the propulsion motor 46 based on inputs received from any of the battery pack 30, the propulsion motor 46, the inputs 54, 56, 66, 68, 70, 72 and the sensor array 62. The main controller 60 can be mounted at any appropriate location on the lawnmower 10 such as but not limited to an upper end of the handle 18 that can be manipulated by the operator to steer the lawnmower 10.

Referring to FIG. 1, the sensor array 62 can be configured to measure rotational motion of the lawnmower 10 about each of the X-axis, the Y-axis and the Z-axis. The X, Y, and Z-axes are displaced away from the lawnmower 10 for clarity of the drawing. However, the origin O is intended to be located on the driveshaft 44 and equidistant from each of the rear wheels 16. The sensor array 62 can include any appropriate type and number of sensor(s) that is/are configured to measure movement about each of the X-, Y- and Z-axes. For example, the sensor array 62 can include a three-axis gyroscope that is mounted on the printed circuit board 58. Alternate embodiments can include a sensor array 62 that includes at least two sensors, where each of the sensors is configured to measure rational motion of the lawnmower 10 about a respective one of the X-axis and the Z-axis.

Figure 3:
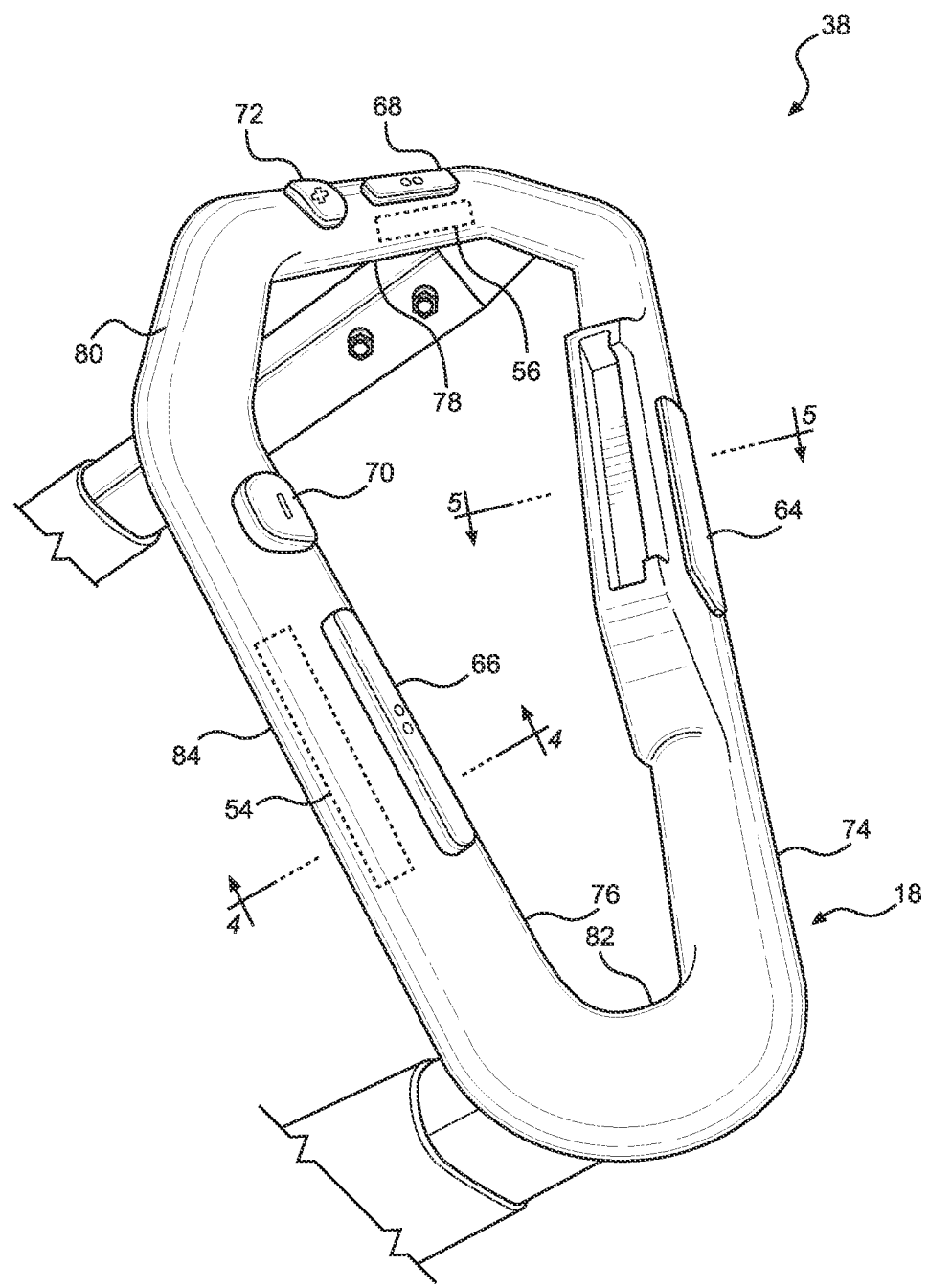
FIG. 3 is a partial perspective view of a handle of the lawnmower of FIG. 1.

Referring to FIG. 3, the handle 18 can include a handle base 74, a first control handle 76, a second control handle 78 and an upper cross member 80 all connected to each other to form a symmetrical polygonal shape. The control handles 76, 78 can be spaced apart from each other and inclined toward each other. The handle base 74 can extend from and be connected to each of the control handles 76, 78. The upper cross member 80 can be connected to and extend from each of the control handles 76, 78. The upper cross member 80 can be spaced away from and substantially parallel to the handle base 74.

Figure 4:
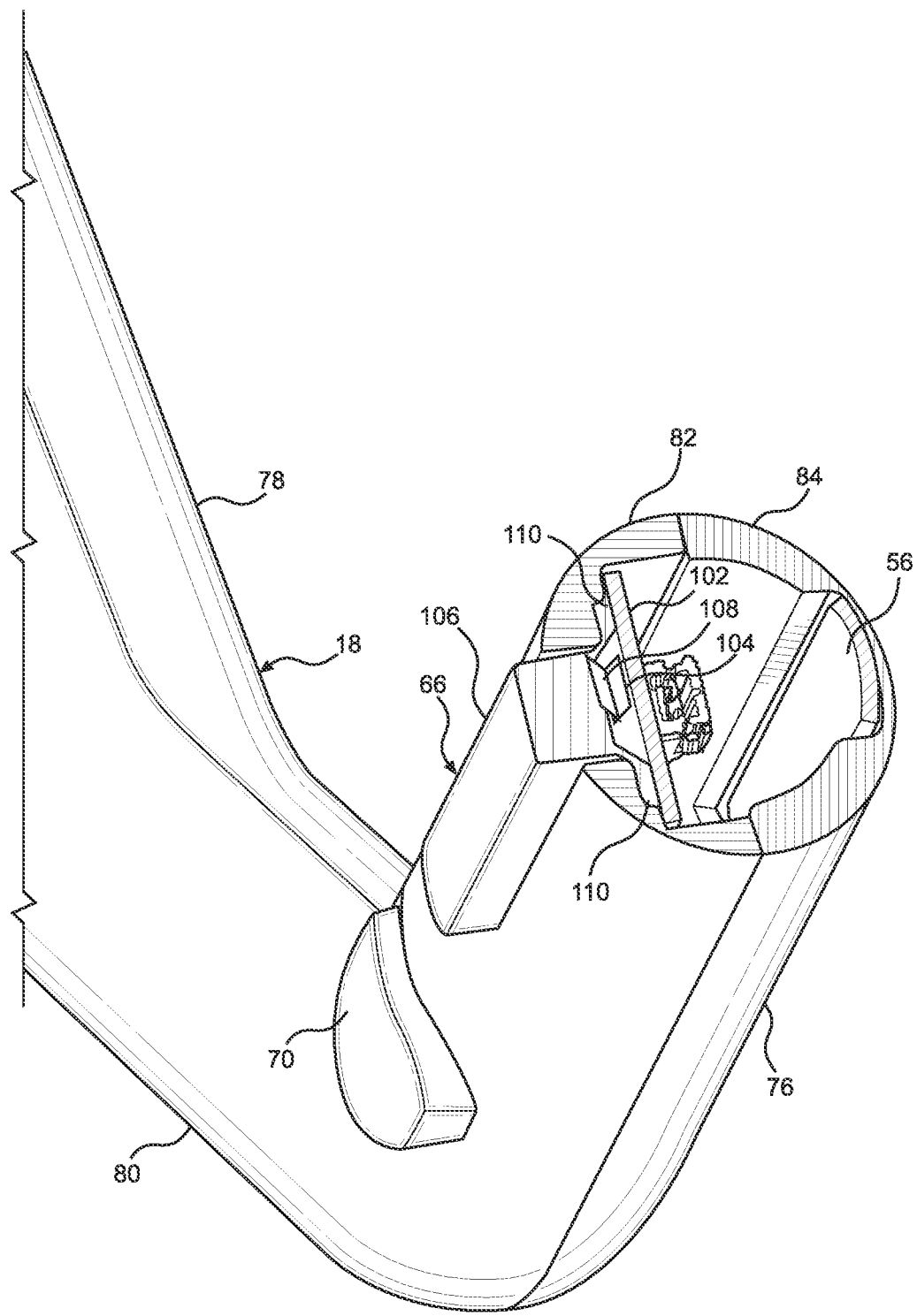
FIG. 4 is a cross-sectional view taken along line 4-4 of FIG. 3.

Referring to FIGS. 3 and 4, the handle 18 can include a main body 82 and a lower half 84 that are formed as separate structures to facilitate the installation of the user inputs 54, 56, 64, 66, 68, 70, 72, the main controller 60 and the sensor array 62 on the handle 18. The lower half 84 can form a lower half of each of the first control handle 74, the second control handle 76 and an upper cross member 80. The main body 82 can form an upper half of each of the first control handle 76, the second control handle 78 and the upper cross member 80.

Referring to FIGS. 1-3, the user inputs of the control system 38 can include a left-side touch sensor 54, a right-side touch sensor 56, a start switch 64, a left-side clutch switch 66, a right-side clutch switch 68, a speed decrease button 70, and a speed increase button 72. The capacitance touch sensors 54, 56 can be located inside of the 76, 78 and are obstructed from view in FIG. 1. The capacitance touch sensors 54, 56 are schematically illustrated in FIG. 2 and schematically illustrated as dashed lines in FIG. 3.

The touch sensors 54, 56 can be in electrical communication with the main controller 60. The touch sensors 54, 56 can be configured to transmit an electrical contact signal to the controller main 60 when the operator's hand contacts the handle 18 in the area where the sensors 54, 56 are located. The touch sensors 54, 56 can be any appropriate sensor such as but not limited to a capacitance sensing element, a resistance switch, and a piezoelectric switch. For example, each of the touch sensors 54, 56 can be configured as capacitance sensing element that includes a metal foil, or a metal plate, or a rigid printed circuit board, or a flexible printed circuit board.

Referring to FIGS. 3 and 4, the left-side touch sensor 66 and the right-side touch sensor 68 can be mounted on the lower half 84 at locations that extend along the first control handle 74 and the second control handle 76, respectively. The lower half 84 can include an outer surface that is also a contact surface of the touch sensors 66, 68 that is engageable by the operator of the lawnmower 10. Alternative embodiments can include a pair of openings through the lower half 84 and a surface of the touch sensors 54, 56 can fill a respective one of the openings.

Referring to FIGS. 1-3 and 5, the start switch 64 can be in electrical communication with the main controller 60. The start switch 64 can be configured to transmit an electrical command signal to the main controller 60 when the operator hand activates the start switch 64. The start switch 64 can be any appropriate switch that can transmit an electrical command signal to the controller 60 that is indicative of a request by the operator to start rotation of the blade 22 when the blade 22 is stopped or indicative of a request by the operator to stop rotation of the blade 22 when the blade 22 is rotating.

The main controller 60 can be configured to signal the blade motor driver 34 to cause the blade motor 32 to rotate the blade 22 when the main controller receives the electrical command signal from the start switch 64 and the blade 22 is stopped (i.e., the blade motor 32 is in an off state). The main controller 60 can be configured to signal the blade motor driver 34 to cause the blade motor 32 to stop rotation of the blade 22 when the main controller 60 receives the electrical command signal from the start switch 64 and the blade 22 is rotating (i.e., the blade motor 32 is in an on state).

Figure 5:
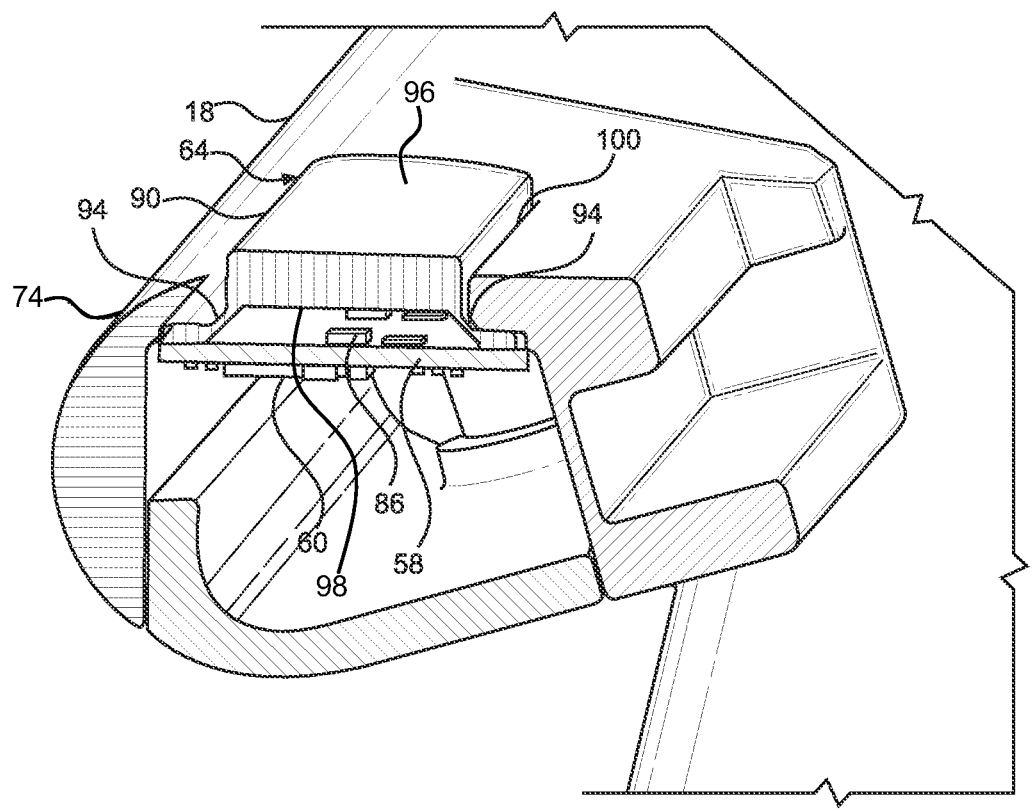
FIG. 5 is a cross-sectional view taken along line 5-5 of FIG. 3.
Figure 6:
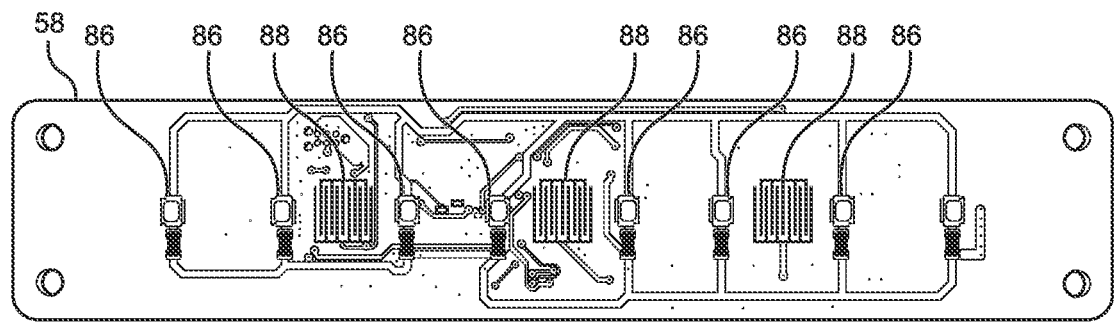
FIG. 6 is a plan view of a printed circuit board of the control system for the lawnmower of FIG. 1.
Figure 7:
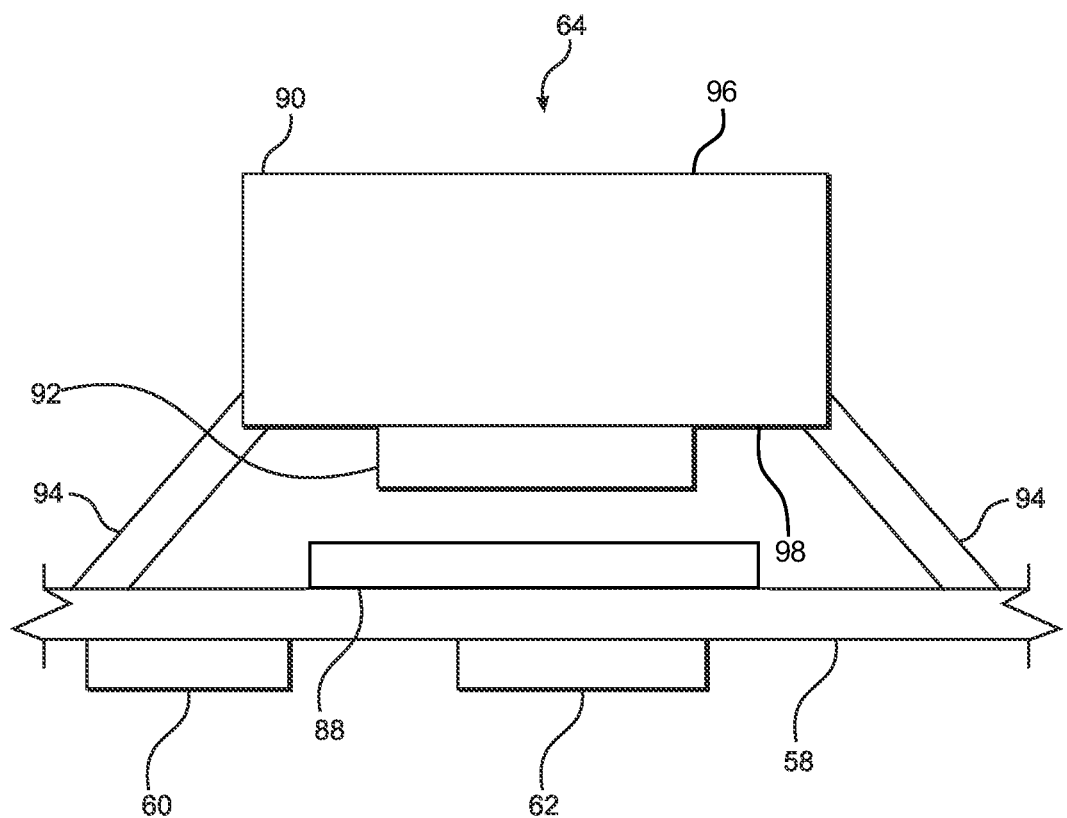
FIG. 7 is s schematic view of an exemplary user input of the control assembly of the lawnmower of FIG. 1.

Referring to FIGS. 5-7 collectively, the start switch 64 can include a circuit board 58, at least one light source 86, at least one switch contact 88, a start button 90, at least one pill contact 92 and a resilient web 94.

The main controller 60 and the sensor array 62 can be mounted on the circuit board 58.

Each of the light sources 86 can be mounted on the printed circuit board 58 and in electrical communication with the controller 60. The light source(s) 86 can be any appropriate light source such as but not limited to a light emitting diode or a laser diode and can emit any appropriate color of light. When including a plurality of light sources, the light sources 86 can be spaced apart from each other along the circuit board to provide a more uniform illumination of the start button 90 along the extent of the start button 90.

The switch contact 88 can be mounted on the printed circuit board 58 and in electrical communication with the controller 60. The switch contact 88 can have any appropriate shape or structure such as but not limited to a plurality of interleaved finger contacts. When including a plurality of switch contacts, the switch contacts 88 can be spaced part from each other along the printed circuit board 58.

The start button 90 can be formed from a transparent or translucent material such that at least some of the light emitted by the light source(s) 86 passes through the start button 90. Referring to FIGS. 5 and 7, the start button 90 can include an engagement surface 96 and an opposing surface 98. The engagement surface 96 can face the operator and be exposed outside of the handle 18. The opposing surface 98 can face the printed circuit board. Referring to FIG. 5, the handle base 74 can include a first opening 100. The start button 90 can extend into and out of the handle base 74 through the first opening 100.

Referring to FIGS. 7, the pill contact 92 can be mounted on the opposing surface 98 of the start button. The number of pill contacts 92 can correspond to the number of switch contacts 88 and spaced along the opposing surface 98 such each pill contact 92 is paired with a respective one of the switch contacts 88. The pill contacts 92 and the switch contacts 88 are spaced away from the location of the cross-sectional view of FIG. 5.

The resilient web 94 can extend from and be connected to each of the printed circuit board 58 and the start button 90. The web 94 can bias the start button 90 away from the printed circuit board 58 such that the pill contact 92 is spaced away from the switch contact 88 when the start switch is not activated by the operator of the lawnmower 10.

Referring to FIG. 1-3, each of the clutch switches 66, 68 can be in electrical communication with the main controller 60. The clutch switches 66, 68 can be configured to cause the drive assembly 36 to selectively drive the rear wheels 16. The left-side clutch switch 66 can be configured to transmit a drive signal to the main controller 60 when the operator engages the left-side clutch switch 66 and terminate transmission of the drive signal when the operator disengages from the left side clutch switch 66. The right-side clutch switch 68 can be configured to transmit a drive signal to the main controller 60 when the operator engages the right-side clutch switch 68 and terminate transmission of the drive signal when the operator disengages from the right-side clutch switch 68.

The main controller 60 can be configured to place the drive assembly 36 in an on state, in which the drive assembly 36 drives the rear wheels 16, when the main controller 60 receives the drive command from either one or both of the clutch switches 66, 68. The main controller 60 can be configured to place the drive assembly 36 in an on state by signaling the propulsion motor driver 42 to supply electricity from the battery pack 30 to the propulsion motor 46. The propulsion motor driver 42 can be configured to signal the propulsion motor 46 to rotate the rear wheels 16 such that the lawnmower 10 moves at a speed that corresponds to the speed that the operator has set using the speed decrease switch 70 or the speed increase switch 72, or in accordance with a predetermined default speed. The main controller 60 can be configured to signal the propulsion motor driver 42 to terminate the drive to the rear wheels 16 when both of the clutch switches 66, 68 terminate transmission of the electrical drive signal. Thus, the operator can cause the lawnmower 10 to propel itself by engaging at least one of the clutch switches 66, 68.

Referring to FIG. 4, each of the clutch switches 66, 68 can include a printed circuit board 102 at least one switch contact 104, a clutch button 106, at least one pill contact 108 and a resilient web 110. FIG. 4 shows the components of the left-side clutch switch 66 with the understanding that the right-side clutch switch 68 can have the same components and layout as the left-side clutch switch 66. The contacts 104, 108, button 106 and web 110 can be arranged in accordance with the corresponding components of the start switch 64 described above. The pill contact 108 and the switch contact 104 are schematically illustrated in from FIG. 4 for reasons of clarity and simplicity of the drawing.

The speed decrease button 70 and the speed increase button 72 can be configured to permit the operator of the lawnmower 10 to set a maximum speed value from a range of possible maximum speed values at which the drive assembly 36 will propel the lawnmower 10. The operator can selectively decrease or increase the maximum speed by pressing the speed decrease button 70 or the speed increase button 72, respectively, until the drive assembly 36 propels the lawnmower 10 at the desired speed. The speed decrease button 70 and the speed increase button 72 can be configured to allow the operator of the lawnmower 10 to continuously vary the speed at which the drive assembly 36 propels the lawnmower 10.

Each of the speed switches 70, 72 can have components, layout and operation as described above with respect to the start switch 64 and the clutch switches 66, 68. Each of the speed switches can be in electrical communication with the main controller 60 and can be configured to transmit an electrical speed decrease signal and an electrical speed increase signal, respectively, when engaged by the operator.

Figure 8:
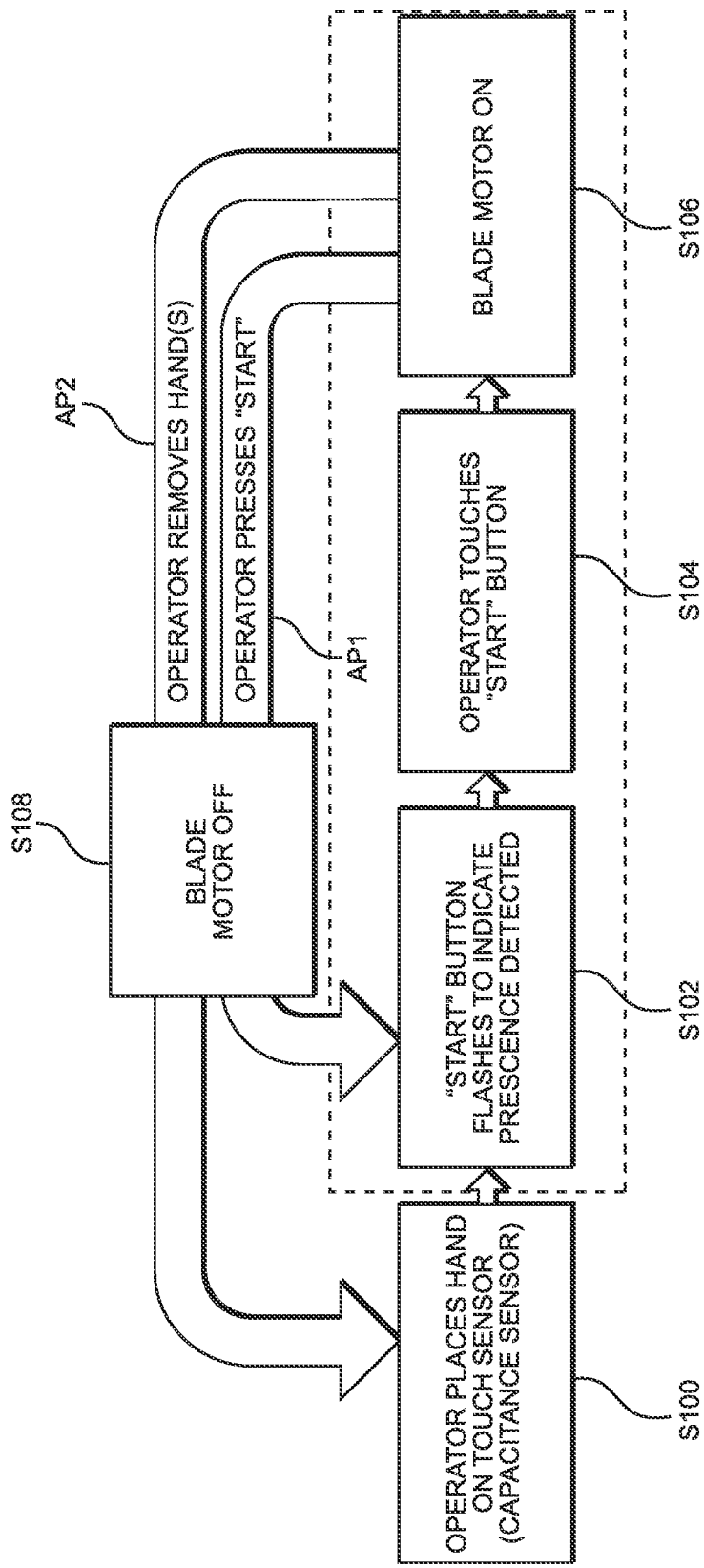
FIG. 8 is a flowchart illustrating exemplary operational steps of the control assembly of the lawnmower of FIG. 1.

FIG. 8 illustrates exemplary control cycles for operating the lawnmower 10 using the control-by-wire system 38. At step S100, the operator of the lawnmower 10 can grasp the handle 18 at a location that includes either of the touch sensors 54, 56. The activated one(s) of the touch sensors 54, 56 can transmit the electrical contact signal to the main controller 60.

In response to the electrical contact signal, the main controller 60 can signal the light source(s) 86 of the start switch 64 to illuminate the start button 90. This illumination can be a constant illumination or a flashing illumination as indicated at step S102.

When the operator displaces the illuminated start button 90 so that the pill contact 92 engages the switch contacts 88, the start switch 64 can transmit the electrical command signal to the main controller 60 as indicated at step S104. Upon receiving the electrical command signal, the main controller 60 can cause the blade motor 32 to turn on and rotate the blade 22 as indicated at step S106.

When the blade motor 32 is on, the operator can either press the start button 64 as indicated by arrow path AP1 or release the handle 18 such that the operator no longer grasps the handle 18 at both locations that correspond to the touch sensors 54, 56 as indicated by arrow path AP2. Either of these actions by the operator can signal the main controller 60 to cause the blade motor 32 to stop rotation of the blade 22 as indicated at step S108.

When the operator presses the start button 90 during operation of the blade motor 32 (arrow path AP1), the operator can signal the main controller 60 to resume operation of the blade motor 32 by engaging the start button 90, as indicated at step S102. When the operator releases the handle 18 such that the touch sensors 54, 56 terminate the transmission of the electrical contact signal during operation of the blade motor 32 (arrow path AP2), the operator must grasp the handle 18 at a location that contains at least one of the touch sensors 54, 56 before the main controller 60 can resume operation of the blade motor 32.

Accordingly, the control-by-wire system 38 can provide the operator with a simple and convenient control of the lawnmower 10 by merely grasping the handle 18 and engaging simple on/off switches such as the switches 64, 66, 68, 70, 72. Further, the control-by-wire system 38 can automatically control the ground speed of the lawnmower 10 when the operator changes direction of the lawnmower 10 to begin cutting a new row of vegetation.

For example, the main controller 60 can be configured to operate in a first mode and in a second mode. In the first mode, the main controller 60 can be configured to cause the drive transmission 40 to propel the lawnmower 10 at a first speed which is set by the operator via the speed switches 70, 72. The first speed can be referred to as a user requested speed. In the second mode, the main controller 60 can be configured to cause the drive transmission 40 to propel the lawnmower 10 at a second speed that is less than the first speed. The second speed can be a predetermined speed. Exemplary embodiments can include a main controller 60 that operates in a second mode such that the main controller 60 causes the drive transmission 40 to stop propulsion of the lawnmower 10 by placing the drive transmission 40 in an off state such that the drive transmission 40 does not cause the drive shaft 44 to rotate the rear wheels 16 of the lawnmower 10.

The main controller 60 can select the first mode and the second made based on data from the sensor array 62. The data from the sensor array 62 can be indicative of a first angular velocity $\omega_1$ and a second angular velocity $\omega_2$ of the lawnmower 10. The first angular velocity $\omega_1$ can be measured about a first rotational axis that is parallel to the Z-axis illustrated in FIG. 1. The first angular velocity $\omega_1$ and the first rotational axis can also be referred to as a yaw rate and a yaw axis, respectively. The second angular velocity $\omega_2$ can be measured about a second rotational axis that is parallel to the X-axis illustrated in FIG. 1. The second angular velocity $\omega_2$ and the second rotational axis can also be referred to as a pitch rate and a pitch axis, respectively.

Specifically, the main controller 60 can compare the first angular velocity $\omega_1$ to a first threshold $\omega_{T1}$ and the second angular velocity $\omega_2$ to second threshold $\omega_{T2}$. If the first angular velocity $\omega_1$ is greater than the first threshold $\omega_{T1}$ and the second angular velocity $\omega_2$ is greater than the second threshold $\omega_{T2}$, then the main controller 60 can select the second mode. However, if either the first angular velocity $\omega_1$ is less than or equal to the first threshold $\omega_{T1}$ or the second angular velocity $\omega_2$ is less than or equal to the second threshold $\omega_{T2}$, the main controller 60 can continue the process of determining whether to select the first mode, remain in the second mode, or terminate the second mode and select the first mode.

The first and second thresholds $\omega_{T1}$, $\omega_{T2}$, can be set at respective predetermined angular velocity values that best or most likely correspond to the rotational motion of the lawnmower 10 as the operator tilts and pivots the lawnmower 10 at the end of a completed row of vegetation and begins a new row of vegetation to be cut. The first and second thresholds $\omega_{T1}$, $\omega_{T2}$, can be set at a respective angular velocity value that can maintain the main controller 60 in the first mode or reduce a frequency at which the main controller 60 selects the second mode when the operator is turning the lawnmower 10 while traversing an inclined surface but not transitioning from a completed row of cut vegetation to a new row of vegetation to be cut.

Thus, main controller 60 can be configured to automatically select and switch between the first mode and the second mode using two angular velocity values of the walk-behind self-propelled machine that are measured about two different rotational axes. This automatic turn-detection feature of the main controller 60 can permit the operator of the lawnmower to tilt and pivot the lawnmower toward a new row of vegetation to be cut without removing either hand from the handle 18 or moving either hand to manipulate the speed switches 70, 72. The drive transmission 40 can be disconnected during the turn at each end of a row to allow for easy manipulation and turning of the lawnmower 10. Alternatively, the speed of the motor 32 can be adjusted downward for a period of time when the sensor array 62 indicates that the lawnmower 10 is experiencing a turn at the end of a row.

Each of the drivers 34, 42 and the main controller 60 can be referred to as an electronic control unit ("ECU") or as a central processing unit ("CPU") or as a microcontroller. The drivers 34, 42 and the main controller 60 can be configured with hardware, with or without software, to perform the assigned task(s). The drivers 34, 42 and the main controller 60 can include or be electrically connected to any appropriate memory device that can store and retrieve programs and/or data for use by the drivers 34, 42 and the main 60. Although the propulsion motor driver 42 and the main controller 60 are referred to separately, a single controller (instead of separate propulsion motor driver 42 and controller 60) can be used to perform the same or similar functions as the driver 42 and the main controller 60 and other control mechanisms including the blade motor driver 34.

Electrical communication lines (not numbered) can connect each of the drivers 34, 42 and the main controller 60 to one or more components of the power supply assembly 20 in any appropriate manner. Electrical communication can be either one-way communication or two-way communication and can be networked or not networked, and can be wireless if desired. The sensor array 62 can be configured with hardware, with or without software, to perform the assigned task(s). The sensor array 62 include one or more smart sensors such that the sensor array 62 can process the raw data collected by the sensor array 62 prior to transmission to the main controller 60 or the sensor array 62 can be configured as a simple sensor that passes the raw data directly to the main controller 60 without any manipulation of the raw data. The sensor array 62 can be configured to send data to the main controller 60, with or without a prompt from the main controller 60.

The disclosed subject matter allows the operator to keep their hands on the handlebar at all times. Instead of modulating a lever or speed adjustment knob, the operator can rely on the turn-sensing drive shutoff system to turn off the transmission when they turn. If they need to adjust the speed during use, they can use their thumbs to make the adjustment, without repositioning their hand or grip. The addition of capacitance sensing makes the control simpler, more comfortable, and more intuitive to use.

While certain embodiments of the invention are described above, it should be understood that the invention can be embodied and configured in many different ways without departing from the spirit and scope of the invention.

For example, embodiments are disclosed above in the context of the button-pill contact switches 64, 66, 68, 70, 72. However, alternate embodiments can include any type of electrical signaling device such as but not limited to a rotary dial, a toggle switch, a tactile switch, a piezoelectric switch, a touch sensor such as touch sensors 54, 56, a touch screen displaying graphical information representative of the operational status of the lawnmower 10 and/or at least one control option, etc.

Each of the signals transmitted to or by the main controller 60 can be a digital signal or an analog signal. Alternative embodiments can include one or more analog signals and one or more digital signals transmitted to or by the controller 60.

Instead of a single driveshaft 44 as shown in FIG. 2, each of the rear wheels 16 can be connected to the drive transmission 40 by a respective driveshaft. Alternate embodiments can include the driveshaft connected to only one of the rear wheels 16, or to only one or both of the front wheels 14.

What is claimed is:

1. A control system for a walk-behind self-propelled machine including a handle, a power source, a drive assembly, and an implement selectively driven by the power source, the control system comprising:
   a touch sensor located on the handle configured to transmit a contact signal indicative of an operator of the walk-behind self-propelled machine physically contacting the handle at a predetermined location; and
   a controller in electrical communication with the touch sensor and configured to,
      enable the power source to drive the implement when the controller receives the contact signal, and
      cause a ready signal to be displayed to the operator when the controller receives the contact signal, the ready signal indicates that a presence of the operator is detected on the handle.

2. The control system according to claim 1, wherein the touch sensor is a capacitance sensing element that forms an outer surface of the handle and includes at least one of a metal plate and a metal foil.

3. The control system according to claim 1, further comprising:
   a clutch switch mounted on the handle and configured to transmit a drive signal to the controller, wherein
   the controller is configured to place the drive assembly in an on state when the controller receives the drive signal from the clutch switch, and
   the drive assembly is configured to propel the walk-behind self-propelled machine when the drive assembly is in the on state.

4. The control system according to claim 3, further comprising:
   at least one sensor for sensing a first angular velocity of the walk-behind self-propelled machine and a second angular velocity of the walk-behind self-propelled machine, the sensor is in electrical communication with the controller, wherein
   the controller is configured to place the drive assembly in an off state when,
      the drive assembly is in an on state,
      the first angular velocity of the walk-behind self-propelled machine is greater than a first threshold, and
      the second angular velocity of the walk-behind self-propelled machine is greater than a second threshold,
   such that the drive assembly terminates propulsion of the walk-behind self-propelled machine when the drive assembly is in the off state.

5. The control system according to claim 3, further comprising:
   a speed switch mounted on the handle at a location adjacent to the clutch switch and in electrical communication with the controller, wherein
   the controller is configured to selectively signal the drive assembly to change a ground speed at which the drive assembly propels the walk-behind self-propelled machine when the drive assembly is in the on state and the controller receives a speed signal from the speed switch.

6. The control system according to claim 5, further comprising;
   a printed circuit board located inside the handle and including a first set of finger contacts in selective electrical communication with the controller and a second set of finger contacts in selective electrical communication with the controller, wherein
   each of the clutch switch and the speed switch includes,
      a button passing through an opening in the handle and including a contact surface exposed outside of the handle,
      a pill contact on the button and facing the printed circuit board and selectively engageable with a respective one of the first set of finger contacts and the second set of finger contacts, and
      a resilient web connected to each of the button and the printed circuit board such that the button is movable relative to the handle and the respective one of the first set of finger contacts and the second set of finger contacts, the resilient web biases the pill contact away from the respective one of the first set of finger contacts and the second set of finger contacts,
   the clutch switch transmits the drive signal when the pill contact of the clutch switch engages the first set of finger contacts, and
   the speed switch transmits the speed signal when the pill contact of the speed switch engages the second set of finger contacts.

7. The control system according to claim 1, further comprising:
   a start switch movably mounted on the handle and configured to transmit a command signal to the controller, wherein
   the controller is configured to,
      enable the start switch when the controller receives the contact signal, and
      cause the power source to drive the implement when the controller receives the command signal.

8. The control system according to claim 7, wherein the controller is configured to cause the power source to terminate driving the implement when the touch sensor terminates the contact signal.

9. The control system according to claim 7, wherein
the start switch includes at least one light source, and
the controller is configured to cause the light source to illuminate the start switch when the controller receives the contact signal and before the controller receives the command signal.

10. The control system according to claim 9, wherein the controller is configured to cause the light source to intermittently illuminate the start switch when the controller receives the contact signal and before the controller receives the command signal.

11. The control system according to claim 7, wherein the start switch includes:
a printed circuit board located in the handle;
a plurality of finger contacts mounted on the printed circuit board;
a light source mounted on the printed circuit board;
a button passing through an opening in the handle and including a contact surface exposed outside of the handle,
a pill contact on the button and facing the printed circuit board and selectively engageable with a respective one of the finger contacts, and
a resilient web connected to each of the button and the printed circuit board such that the button is movable relative to the handle and the finger contacts, the resilient web biases the pill contact away from the finger contacts, wherein
the start switch transmits the start signal when the pill contact engages the finger contacts.

12. The control system according to claim 11, wherein the controller is mounted on the printed circuit board, and the implement is a lawnmower blade.

13. A walk-behind lawnmower comprising:
a cutter housing;
a blade rotatably supported in the cutter housing;
a power source mounted on the cutter housing and configured to selectively rotate the blade;
a plurality of wheels supporting the cutter housing;
a handle connected to the cutter housing and extending away from the cutter housing;
a drive assembly mounted to the cutter housing, connected to at least one of the wheels, and configured to selectively drive the at least one wheel; and
a control-by-wire system in electrical communication with the drive assembly and including,
a user input structure located on the handle and configured to transmit a plurality of different electrical control signals,
a touch sensor mounted on the handle and configured to transmit a contact signal indicative of an operator of the walk-behind lawnmower physically contacting a predetermined location on the handle, and
a controller in electrical communication with each of the user input structure and the touch sensor, the controller is configured to,
cause the power source to rotate the blade when the controller receives the contact signal and based on which of the electrical control signals the controller receives, and
transmit a drive control signal to the drive assembly based on which of the electrical control signals the controller receives.

14. The walk-behind lawnmower according to claim 13, further comprising:
a battery pack mounted on the cutter housing;
an electric blade motor mounted on the cutter housing, connected to the blade and configured to selectively rotate the blade in the cutter housing, and in selective electrical communication with the battery pack, wherein
the drive assembly includes an electric drive motor mounted on the cutter housing and in selective electrical communication with the battery pack.

15. The walk-behind lawnmower according to claim 14, wherein
the touch sensor is an electrical capacitance sensing element, and
the controller is configured to cause the electric blade motor to stop rotation of the blade when the touch sensor terminates the contact signal.

16. The walk-behind lawnmower according to claim 14, wherein
the handle includes a first control handle, a second control handle spaced away from and symmetrically arranged with respect to the first control handle, and a handle base connected to and extending from each of the first and second control handles, and
the touch sensor extends along each of the first and second control handles.

17. The control system according to claim 16, wherein the control-by-wire system includes,
a start switch movably mounted on the handle base and configured to transmit a command signal to the controller when moved to an activated position,
a first clutch switch movably mounted on the first control handle and configured to transmit a drive signal to the controller when moved to an activated state,
a second clutch switch movably mounted on the second control handle and configured to transmit the drive signal to the controller when moved to an activated state,
the controller is configured to,
cause the electric blade motor to rotate the blade when the controller receives the contact signal and the command signal,
when the electric blade motor is rotating the blade, cause the electric blade motor to stop rotation of the blade when the touch sensor terminates the contact signal or when the controller receives the command signal,
cause the drive assembly to drive the at least one wheel when the controller receives the drive signal from the first clutch switch or the second clutch switch, and
when the drive assembly is driving the at least one wheel, cause the drive assembly to stop driving the at least one wheel when both of the first clutch switch and second clutch switch terminate transmission of the drive signal.

18. The control system according to claim 17, wherein the control-by-wire system includes,
a first speed switch movably mounted on the first control handle at a location that is adjacent to the first clutch switch, and configured to transmit a first speed signal to the controller when moved to an activated position, and
a second speed switch movably mounted on the second control handle at a location that is adjacent to the second clutch switch, and configured to transmit a second speed signal to the controller, and the controller is configured to,
  cause the drive assembly to decrease a rotational speed of the at least one wheel when the controller receives the first speed signal, and
  cause the drive assembly to increase a rotational speed of the at least one wheel when the controller receives the second speed signal.

19. A method for controlling a walk-behind self-propelled machine comprising:
  electronically sensing a presence of an operator grasping a handle of the walk-behind self-propelled machine;
  enabling a power source to drive an implement of the walk-behind self-propelled machine when the presence of the operator is sensed electronically;
  displaying a ready signal to the operator when the presence of the operator is sensed electronically;
  moving the implement when the operator inputs an electronic drive command in response to the ready signal; and
  terminating movement of the implement when electronically sensing the absence of the operator grasping the handle or when the operator inputs an electronic stop command.

20. The method according to claim 19, further comprising:
  controlling a ground speed of the walk-behind self-propelled machine by,
    selecting one of a first mode and a second mode based on a first angular velocity of the walk-behind self-propelled machine and a second angular velocity of the walk-behind self-propelled machine that is different from the first angular velocity of the walk-behind self-propelled machine, and
    causing a drive assembly to drive the at least one wheel of the walk-behind self-propelled machine at a first speed when the controller is in the first mode and terminate drive of the at least one wheel when the controller is in the second mode.

\* \* \* \* \*